(12) United States Patent
de Silva et al.

(10) Patent No.: US 6,615,347 B1
(45) Date of Patent: Sep. 2, 2003

(54) DIGITAL CERTIFICATE CROSS-REFERENCING

(75) Inventors: Mahinda K. de Silva, Sunnyvale, CA (US); Ram A. Moskovitz, Mountain View, CA (US)

(73) Assignee: VeriSign, Inc., Mountain View, CA (US)

(*) Notice: Subject to any disclaimer, the term of this patent is extended or adjusted under 35 U.S.C. 154(b) by 0 days.

(21) Appl. No.: 09/107,655

(22) Filed: Jun. 30, 1998

(51) Int. Cl.[7] ............................................. H04L 9/00
(52) U.S. Cl. ...................... 713/156; 713/157; 713/158
(58) Field of Search ................................. 713/155–158

(56) References Cited

U.S. PATENT DOCUMENTS

| | | | | |
|---|---|---|---|---|
| 4,868,877 A | * | 9/1989 | Fischer | 713/157 |
| 5,136,646 A | * | 8/1992 | Haber et al. | 713/178 |
| 5,214,702 A | * | 5/1993 | Fischer | 380/30 |
| 5,666,416 A | * | 9/1997 | Micali | 380/286 |
| 5,699,431 A | * | 12/1997 | Van Oorschot et al. | 380/30 |
| 5,745,574 A | * | 4/1998 | Muftic | 713/157 |
| 5,903,882 A | * | 5/1999 | Asay et al. | 705/44 |
| 5,956,404 A | * | 9/1999 | Schneier et al. | 380/30 |

OTHER PUBLICATIONS

ITU–T Recommendation X.509, Telecommunication Standardization Sector of ITU, Nov. 1993.*
RSA Data Security, Inc., PKCS#6: Extended–Certificate Syntax Standard, RSA Security, Jun. 3, 1991, entire document.*
RSA Data Security, Inc., PKCS#9: Selected Attribute Types, RSA Security, Nov. 1, 1993, entire document.*
ISO/IEC et al, Draft Amendments DAM 4 to ISO/IEC 9594–2 on Certificate Extensions, Collaborative Editing Meeting on the Directory, Geneva, Apr. 1996, all.*
Wayner, Peter, Who Goes There?, BYTE Magazine, Jun. 1997, all.*

* cited by examiner

Primary Examiner—Gail Hayes
Assistant Examiner—Ronald Baum
(74) Attorney, Agent, or Firm—Fenwick & West LLP

(57) ABSTRACT

As part of a security infrastructure based on public-key cryptography, a first digital certificate (200) is issued by a first certification authority (104) to a first subscriber (102) and binds the first subscriber (102) to a first public key (210). The first public key (210) corresponds to a first private key held by the first subscriber (102), and the first public key and the first private key form a key pair for use in public-key cryptography. The first digital certificate (200) is digitally signed by the first certification authority (104) and includes subscriber information (206) pertaining to the first subscriber (102) and related certificate information (216) at least partially identifying a second digital certificate (200). The second digital certificate (200) is issued by a second certification authority (104) to a second subscriber (102) and is digitally signed by the second certification authority (104). It binds the second subscriber (102) to a second public key (210) corresponding to a second private key held by the second subscriber (102). The second public key and the second private key form a key pair for use in public-key cryptography. The first subscriber (102) is matched to the second subscriber (102).

27 Claims, 7 Drawing Sheets

DIGITAL CERTIFICATE CROSS-REFERENCING

BACKGROUND OF THE INVENTION

1. Technical Field

This invention relates generally to digital certificates issued by a certification authority, digital signatures, and public key cryptography, all of which are part of a security infrastructure for on-line transactions. More particularly, this invention relates to the cross-referencing of such digital certificates.

2. Background Art

As a result of the continuous development of new technologies, particularly in the areas of computer networks and communications, the use of large computer networks, such as the Internet, is becoming more widespread. This has resulted in an increase in electronic commerce and other electronic transactions conducted over these networks, with a corresponding need for security for these transactions.

Public key cryptography, as described in Bruce Schneier, *Applied Cryptography* (John Wiley & Sons, Inc., New York, 1996), is one technology addressing this need for security. A public key infrastructure (PKI) is based on assigning key pairs to entities. Each key pair includes a private key and a public key. Either key may be used to encrypt a message; the other key must be used to decrypt the message. The private key is securely held by the entity to which it is assigned; while the public key is made widely available.

The use of these key pairs addresses many of the inherent security problems in an open network such as the Internet. However, without more, two significant problems remain. First, parties must be able to access the public keys in an efficient manner. Second, since communications and transactions are secured by the key pairs and entities are associated with and in some sense identified by their public keys, there must be a secure method for third parties to verify that a certain public key corresponds to a certain entity.

Digital certificates are one method for addressing both of these problems. A trusted third party, commonly known as a certification authority or issuer, issues digital certificates to subscribers. Each digital certificate typically includes the subscriber's public key along with other information about the subscriber. One purpose of the digital certificate is to document in a trustworthy manner that the public key is associated with the subscriber. In other words, the digital certificate "binds" the subscriber to the public key. The trustworthiness is typically provided by having the issuer of the digital certificate "digitally sign" the certificate, thereby securing its contents against subsequent tampering. Third parties who wish to verify that a certain public key corresponds to a certain subscriber may do so by examining the corresponding digital certificate.

For security and other reasons, digital certificates typically are valid only for a limited period of time. For example, when digital certificates are issued, they typically have an expiration date after which they are no longer valid. Alternately, a digital certificate may be compromised prior to its expiration date, in which case, the issuer may actively revoke the digital certificate. In these and other cases, the subscriber must obtain a new digital certificate to replace the old digital certificate and, over any significant period of time, a subscriber will likely have had an entire series of digital certificates.

It is often desirable to be able to efficiently determine the relationship between two digital certificates, particularly if one digital certificate is a replacement for the other. For example, an on-line merchant may have accumulated significant amounts of information about a specific subscriber, who is identified primarily by his public key and the corresponding digital certificate. If this digital certificate is replaced by a new digital certificate, it would be desirable for the merchant to ascertain this so that he may associate the accumulated information with the new digital certificate.

Thus, there is a need for cross-referencing of digital certificates.

DISCLOSURE OF INVENTION

One aspect of the present invention is a computer readable medium (120) storing a first digital certificate (200). The first digital certificate (200) is issued by a first certification authority (104) to a first subscriber (102), binds the first subscriber (102) to a first public key (210), and is digitally signed by the first certification authority (104). The first digital certificate (200) includes subscriber information (206) pertaining to the first subscriber (102) and related certificate information (216) at least partially identifying a second digital certificate (200). The second digital certificate (200) is issued by a second certification authority (104) to a second subscriber (102), binds the second subscriber (102) to a second public key (210), and is digitally signed by the second certification authority (104). The first subscriber (102) is matched to the second subscriber (102).

Another aspect of the present invention is a method (400) for creating such a first digital certificate (200). A second digital certificate (200), the subscriber (102) of which matches the first subscriber (102), is identified (402). Subscriber information (206) pertaining to the first subscriber (102) and related certificate information (216) at least partially identifying the second digital certificate (200) are included (404) in the first digital certificate (200). The first digital certificate (200) is digitally signed by an issuer (104).

Another aspect of the invention is a method (600, 700) for processing such first digital certificates (200). The first digital certificate (200) is authenticated (602, 702). The first digital certificate (200) includes related certificate information (216) at least partially identifying a second digital certificate (200) with a matching subscriber. Based on this related certificate information (216), a status of the second digital certificate (200) is determined (606, 706). The first digital certificate (200) is then processed (608, 708) responsive to the status of the second digital certificate (200).

The present invention is particularly advantageous because information (216) concerning related digital certificates (200) is securely recorded on the digital certificate (200) itself. Hence, users (108) of the digital certificate (200) can determine the relationship of the digital certificate (200) to the other digital certificates (200) and can tailor their actions accordingly.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
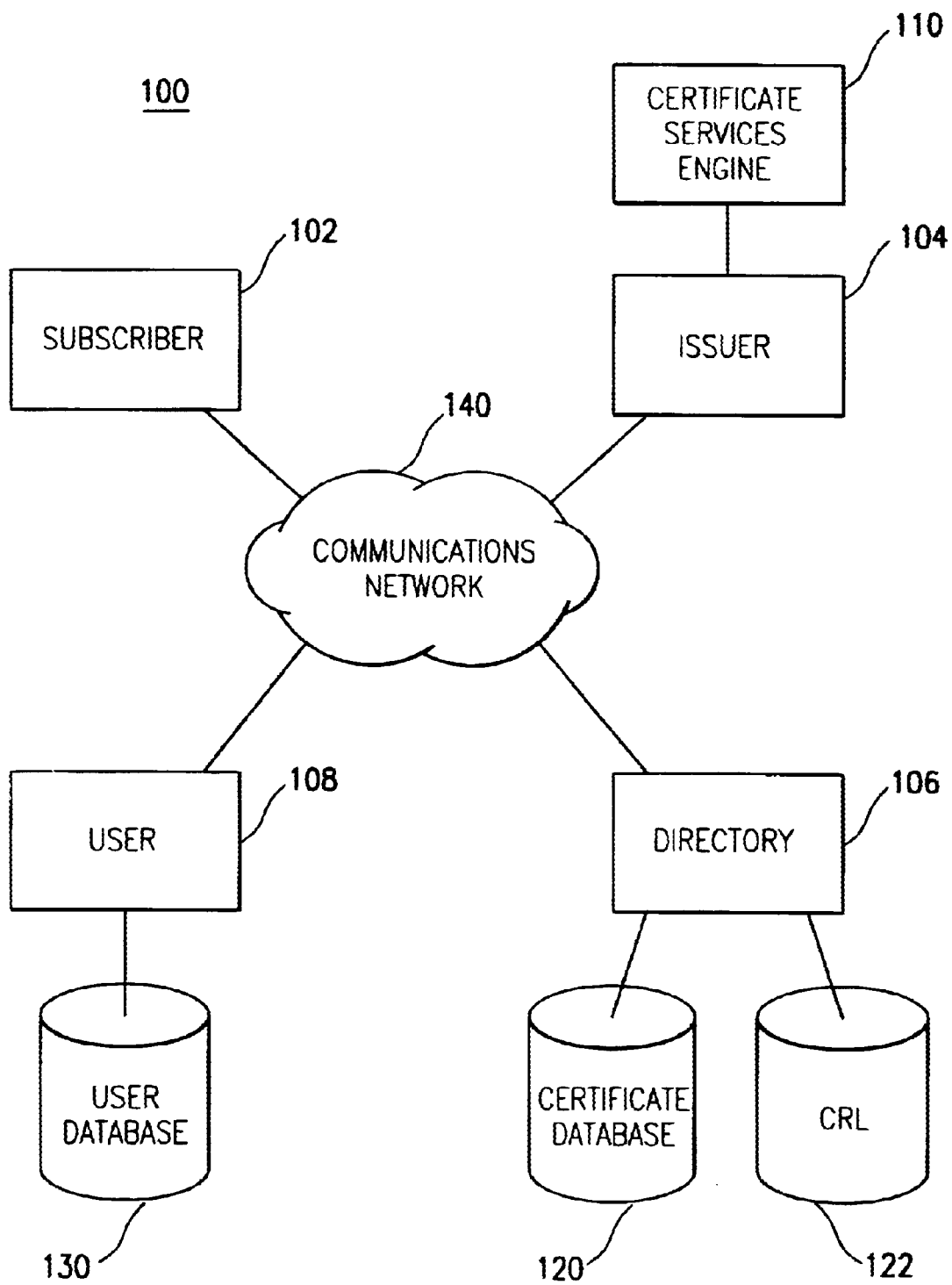
FIG. 1 is a block diagram of a system 100 suitable for use with the present invention.

FIG. 1 is a block diagram of a system 100 suitable for use with the present invention. The system 100 includes a subscriber 102, an issuer 104, a directory 106, and a user 108, all of which are coupled to a communications network 140. The system 100 further includes a certificate services engine 110, a digital certificate database 120, a certificate revocation list (CRL) 122, and a user database 130. The certificate services engine 110 is coupled to issuer 104. The digital certificate database 120 and CRL 122 are coupled to the directory 106. The user database 130 is coupled to user 108.

The labels "subscriber", "issuer", "directory", and "user" are given to describe the role which each of these entities plays with respect to digital certificates used in a public-key infrastructure (PKI). In a PKI, security is achieved by using public-key cryptography, and entities such as subscriber 102 are associated with a key pair which includes a public key and a private key. Subscriber 102 holds his private key securely and makes his public key widely available by means of a digital certificate issued by issuer 104, also known as a certification authority.

As used in this description, "digital certificate" means a document which associates the subscriber 102 with his public key and is digitally signed by the issuer 104, using the issuer's private key. A digital certificate is "digitally signed" by an issuer 104 if a third party can verify that the issuer 104 has signed the document and can also verify that the contents of the document have not changed since the issuer 104 has signed. Preferably, this is achieved by one-way hashing the document and then encrypting the one-way hash using the issuer 104's private key to produce a digital signature included as part of the digital certificate. Issuer 104 uses certificate services engine 110 to issue digital certificates, as well as to possibly supply other digital certificate services.

Directory 106 is designed to facilitate efficient access to digital certificates. Once issuer 104 has issued a digital certificate to subscriber 102, the digital certificate may be easily accessed from a number of places, including directory 106. In system 100, directory 106 is coupled to a digital certificate database 120 and to a CRL 122. Digital certificate database 120 is a database of digital certificates, including subscriber 102's digital certificate. CRL 122 is a database of digital certificates which have been revoked.

User 108 is an entity which uses subscriber 102's digital certificate, typically to authenticate that an unknown party is the specific subscriber 102 who he claims to be. For example, an unknown party might approach user 108 over communications network 140, claiming to be a specific subscriber 102. As proof of this, the unknown party might supply his digital certificate to user 108. User 108 verifies that the contents of the digital certificate have not been tampered with. Then, if user 108 trusts the issuer 104 of the digital certificate, user 108 can also trust that the subscriber 102 named in the digital certificate is bound to the public key contained in the certificate. Hence, if the unknown party communicates using the corresponding private key, then user 108 can further trust that the unknown party is the subscriber 102 named in the digital certificate. If user 108 does not trust issuer 104, user 108 will request issuer 104's digital certificate in order to authenticate the identity of issuer 104. User will repeat this process traversing up a chain of digital certificates until it reaches an issuer 104 which it trusts, at which point, user 108 will have authenticated that the unknown party is subscriber 102.

In a different variation, the unknown party might not supply its digital certificate. Instead, the party may supply information about himself and user 108 might then retrieve the appropriate digital certificate from directory 106. Directory 106 retrieves the digital certificate from digital certificate database 120 and also checks CRL 122 to insure that the digital certificate has not been revoked. User 108 then authenticates the identity of the unknown party, using the same procedure as described above.

Once user 108 has authenticated the identity of subscriber 102 using subscriber 102's digital certificate, the certificate becomes a "trusted" digital certificate and user 108 may store the trusted digital certificate in user database 130. Then, when subscriber 102 subsequently contacts user 108, the entire authentication process need not be repeated. Instead, user 108 may simply access user database 130 for subscriber 102's trusted digital certificate, provided that the digital certificate has not been revoked or otherwise compromised during the interim. User database 130 may also include any other information about subscriber 102 which user 108 finds useful.

In FIG. 1, subscriber 102, issuer 104, directory 106, and user 108 are shown as separate entities. In fact, a single entity may play more than one role. For example, a certification authority may play the role of both issuer 104 and directory 106. Alternately, the user 108 may also function as a directory 106 for digital certificates of subscribers 102 who frequent the user 108, as described previously. Entities may also take on different roles in different contexts. For example, an intermediate digital certificate authority will be a subscriber 102 with respect to the entity which issues the intermediate digital certificate authority's digital certificate but will be an issuer 104 with respect to digital certificates which it issues. In addition, subscriber 102, issuer 104, directory 106, and user 108 have been referred to as entities because they, in fact, may be individuals, computer servers, corporations, organizations, e-mail locations, or any other entity which may be involved in the digital certificate structure. These entities, however, will typically communicate to the communications network 140 via a computer.

In a preferred embodiment which will be used to illustrate various aspects of the invention, communications network 140 is the Internet. Subscriber 102 is an individual accessing the Internet via a commercial browser, such as Netscape's Navigator or Microsoft's Internet Explorer. User 108 is a merchant with an on-line storefront, typically implemented by e-commerce software running on a server. Issuer 104 and directory 106 are implemented on servers by commercial vendors of digital certificate services, such as VeriSign. It should be noted that the invention may be used with systems other than those using the architecture of FIG. 1. For example, the entities 102, 104, 106, and 108 may communicate with each other over separate communications networks or dedicated communications channels, rather than through the common communications network 140 of FIG. 1. Alternately, various parts of system 100 may be implemented by mobile components and may not be permanently attached to a communications network. For example, subscriber 102 may interact with the other entities via a smart card, which may contain subscriber 102's digital certificate.

Figure 2:
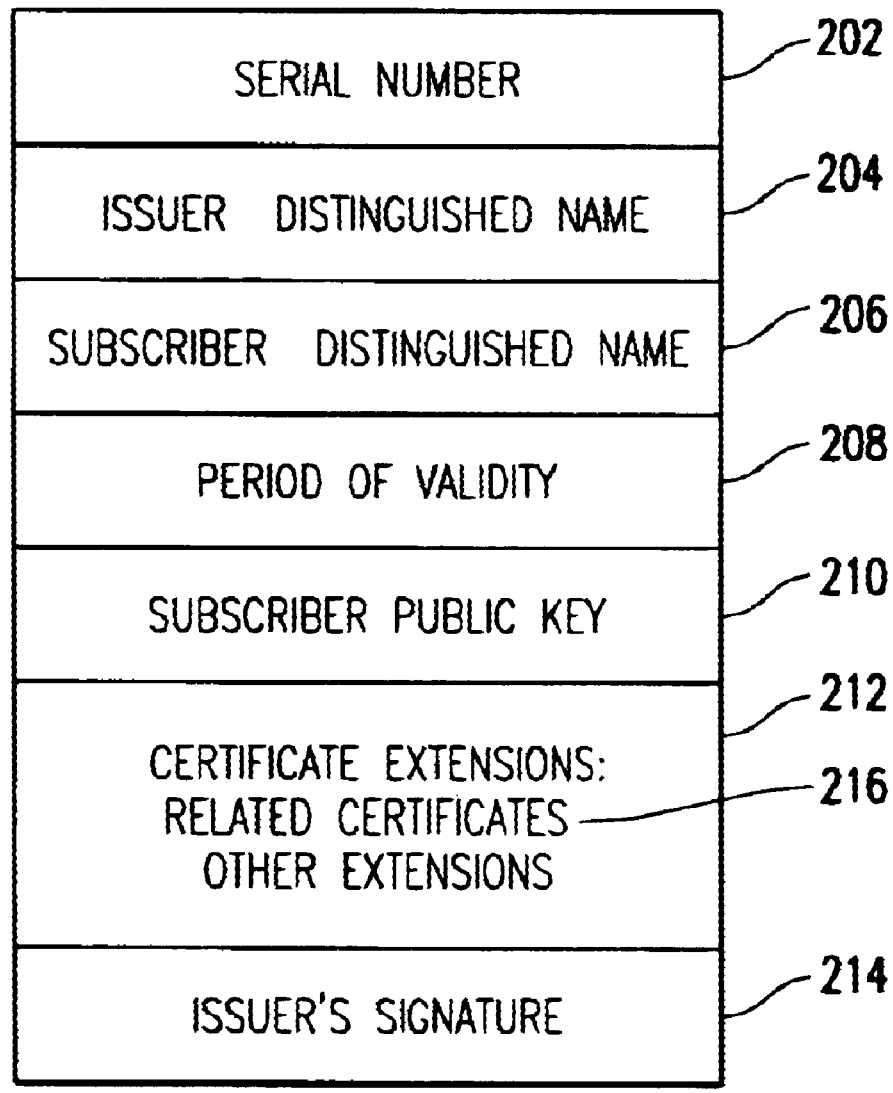
FIG. 2 is an illustration of a preferred embodiment of a digital certificate 200 in accordance with the present invention.

FIG. 2 is an illustration of a preferred embodiment of a digital certificate 200 in accordance with the present invention. The digital certificate 200 complies with the ITU-T Recommendation X.509 (1997 E), as developed by the ISO/IEC/ITU groups, and is stored in the digital certificate database 120. In other embodiments, the digital certificate 200 may be stored on other types of computer readable media, such as on smart cards, in flash memory, on magnetic stripes such as on the back of credit cards, or as printed bar codes.

The digital certificate 200 includes a serial number 202, the issuer 104's distinguished name 204, the subscriber 102's distinguished name 206, a period of validity 208, the subscriber 102's public key 210, possibly digital certificate extensions 212, and the issuer 104's digital signature 214. The serial number 202 identifies the digital certificate 200; issuers 104 typically provide a unique serial number 202 for each digital certificate 200 issued by the issuer 104. The issuer's and subscriber's distinguished names 204 and 206 are, respectively, the distinguished names of the issuer 104 and subscriber 102. A distinguished name for an entity is information about the entity, including for example the entity's name, address, and/or email address. The period of validity 208 contains information regarding the time period during which the digital certificate 200 is valid. For example, the period of validity 208 may include an effective date and an expiration date of the digital certificate 200. Digital certificate extensions 212 are information which may be tailored by various issuers 104 for their specific purposes. In this particular embodiment, the digital certificate extensions 212 follow the X.509 format and include information 216 about other related digital certificates. The issuer's digital signature 214 is a version of the information in the digital certificate 200 which has been processed using the issuer's private key (typically one-way hashed and then encrypted with the issuer's private key). The signature 214 secures the digital certificate 200.

Figure 3:
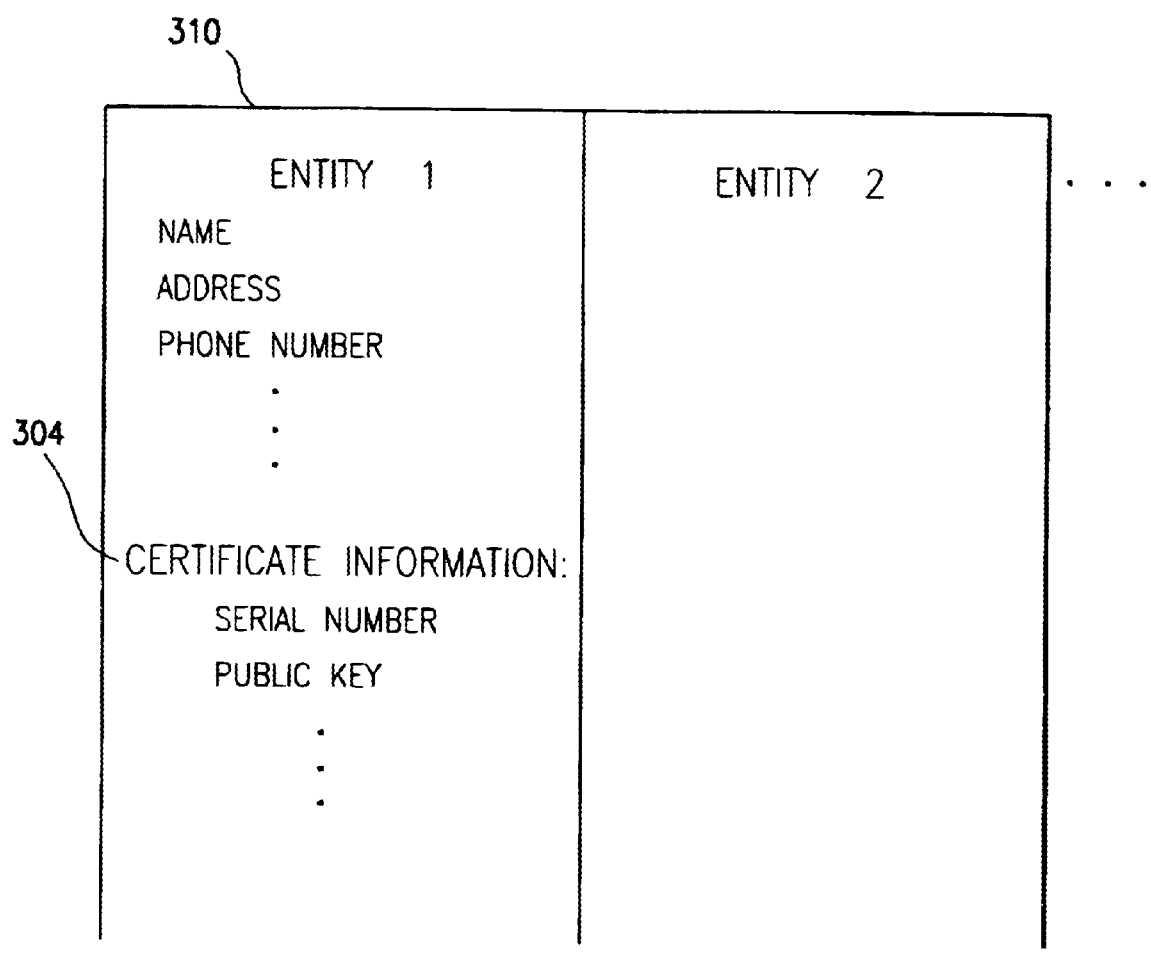
FIG. 3 is an illustration of a user database 130 suitable for use with the present invention.

FIG. 3 is an illustration of a user database 130 suitable for use with the present invention. The user database 130 contains records 310 for various entities. For example, subscriber 102 might shop at user 108's retail store in the physical world and have a credit card from user 108. The subscriber's record 310 might include subscriber's name, address, phone number, credit card account number and credit card account balance. It might also include past buying habits, specific product preferences, or any of a number of other items of information about subscriber 102.

When subscriber 102 shops on-line, information 304 from the subscriber's digital certificate 200 or even the entire digital certificate 200 may also be included in his record 310. For example, the subscriber's digital certificate 200 may be identified by the serial number 202. The user database 130 may use the serial number 202 to connect the subscriber's public key with the rest of his record 310. When subscriber 102 subsequently shops on-line with user 108, the subscriber 102 is identified via his digital certificate 200. The digital certificate's serial number 202 then associates the subscriber 102 with his record 310. However, if the subscriber 102 changes digital certificates, for example because the previous digital certificate 200 was revoked or expired, his new digital certificate 200 will have a different serial number. Then when the subscriber 102 shops on-line with user 108, the user will not be able to use the digital certificate serial number 202 to match the subscriber 102 with his record 310 because the new digital certificate's serial number 202 does not match the serial number 202 in record 310.

In an alternate example scenario, user 108 may be an on-line stock brokerage. Subscriber 102 may have to go through an extensive check to verify his identity, past financial history, current credit rating, etc., before user 108 grants him an account for trading. Record 310 might then include subscriber 102's credit limit, account information, or other sensitive financial information; while certificate information 304 might include both the digital certificate's serial number 202 and a one-way hash of the entire digital certificate 200. When subscriber 102 subsequently visits user 108 on-line in order to trade stocks, user 108 might first check the serial number and hash of subscriber 102's digital certificate 200 against those contained in record 310 before allowing subscriber 102 to access the corresponding account. If subscriber. 102 now changes digital certificates, he will appear to be an unknown visitor to user 108 because the new digital certificate does not match the information 304 contained in record 310. Hence, user 108 may request that subscriber 102 repeat the verification process or at least provide some substantial proof that the subscriber of the new digital certificate is the same as the subscriber of the digital certificate recorded in information 304.

Figure 4:
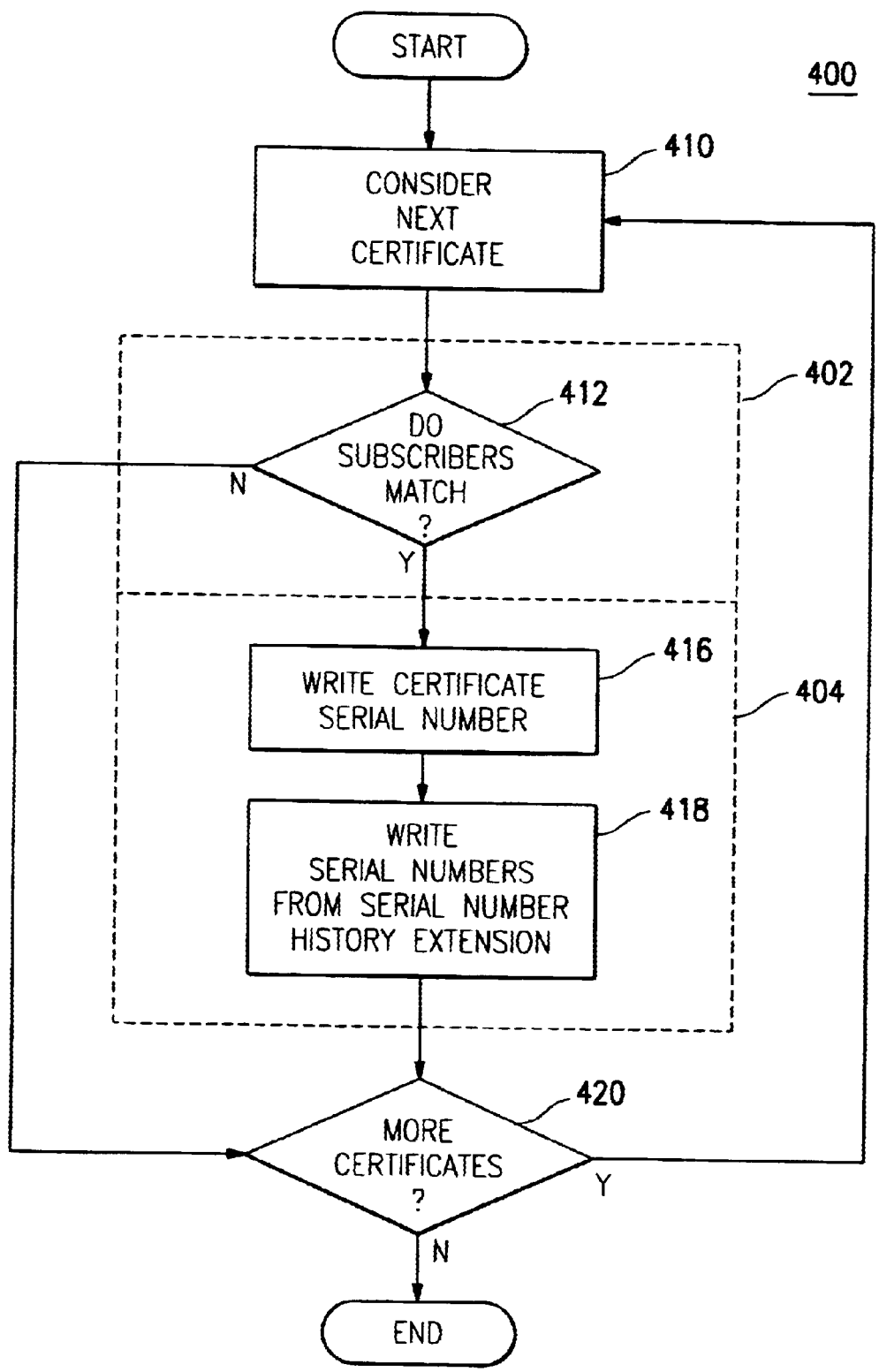
FIG. 4 is a flow diagram illustrating a method 400 for creating a digital certificate 200.

FIG. 4 is a flow diagram illustrating a preferred method 400 for creating a digital certificate 200 which addresses this problem. The method 400 includes two basic steps. First, when subscriber 102 requests a new digital certificate 200, the issuer 104 identifies 402 other digital certificates which have subscribers which match subscriber 102. The issuer 104 then writes 404 information at least partially identifying these other digital certificates to the new digital certificate 200.

In method 400, issuer 104 considers 410 each digital certificate 200 in directory 106 and determines 412 whether there is a match between that digital certificate's subscriber and subscriber 102. As used here, the term "match" means that a strong correlation exists. It does not imply an exact match, which will be denoted by the term "exact match". For example, matching subscribers might require that at least four of the items in the subscriber distinguished name 206 of an existing digital certificate 200 match the subscriber 102's distinguished name. A stronger matching criterion would require an exact match between the distinguished names. An even stronger matching criterion would require that the subscriber 102 also prove that he held the private key corresponding to the public key of an existing digital certificate 200 or that it was independently verified that subscriber 102 exactly matched the subscriber of the existing digital certificate 200. Matching may also be based on additional information contained in the digital certificate extensions 212 or even information external to the digital certificates 200. The appropriate matching criteria will depend on the desired level of security.

If there is no match, issuer 104 determines 420 whether there are any other digital certificates 200 to be considered. If there are, the process is repeated for a next digital certificate 200 from directory 106. If not, method 400 is completed. If there is a match, issuer 104 writes 416 the serial number 202 of the digital certificate 200 to the digital certificate extensions 216 of the new digital certificate 200 in an extension which shall be referred to as the serial number history extension. In addition, if the digital certificate 200 from directory 106 was created in the same manner, it may also have a serial number history extension 216. Issuer 104 also writes 418 the serial numbers from this serial number history extension 216 to the serial number history extension 216 of the new digital certificate 200. Once method 400 is completed, the new digital certificate 200 will have in its serial number history extension 216 a series of serial numbers of other digital certificates 200 which have matching subscribers.

In a preferred variation of method 400, the method 400 is executed only when a subscriber 102 replaces or renews his digital certificate. It would not, for example, be executed for new subscribers since they do not have pre-existing digital certificates. In addition, the matching criteria is simplified such that the subscriber on an existing digital certificate will match subscriber 102 only if the existing digital certificate is the digital certificate being replaced or renewed. This is logical because when a subscriber 102 requests a replacement or renewal of an existing digital certificate, by definition, the subscriber 102 is the same as the subscriber named on the digital certificate to be replaced or renewed. In other words, by identifying which digital certificate is to be replaced or renewed, the subscriber 102 has determined 412 which digital certificate meets the matching criteria. Furthermore, limiting the matching criteria to only the replaced/renewed digital certificate simplifies method 400 since no other digital certificates need be considered and the loop including steps 410 and 420 in method 400 need not be executed.

Figure 5:
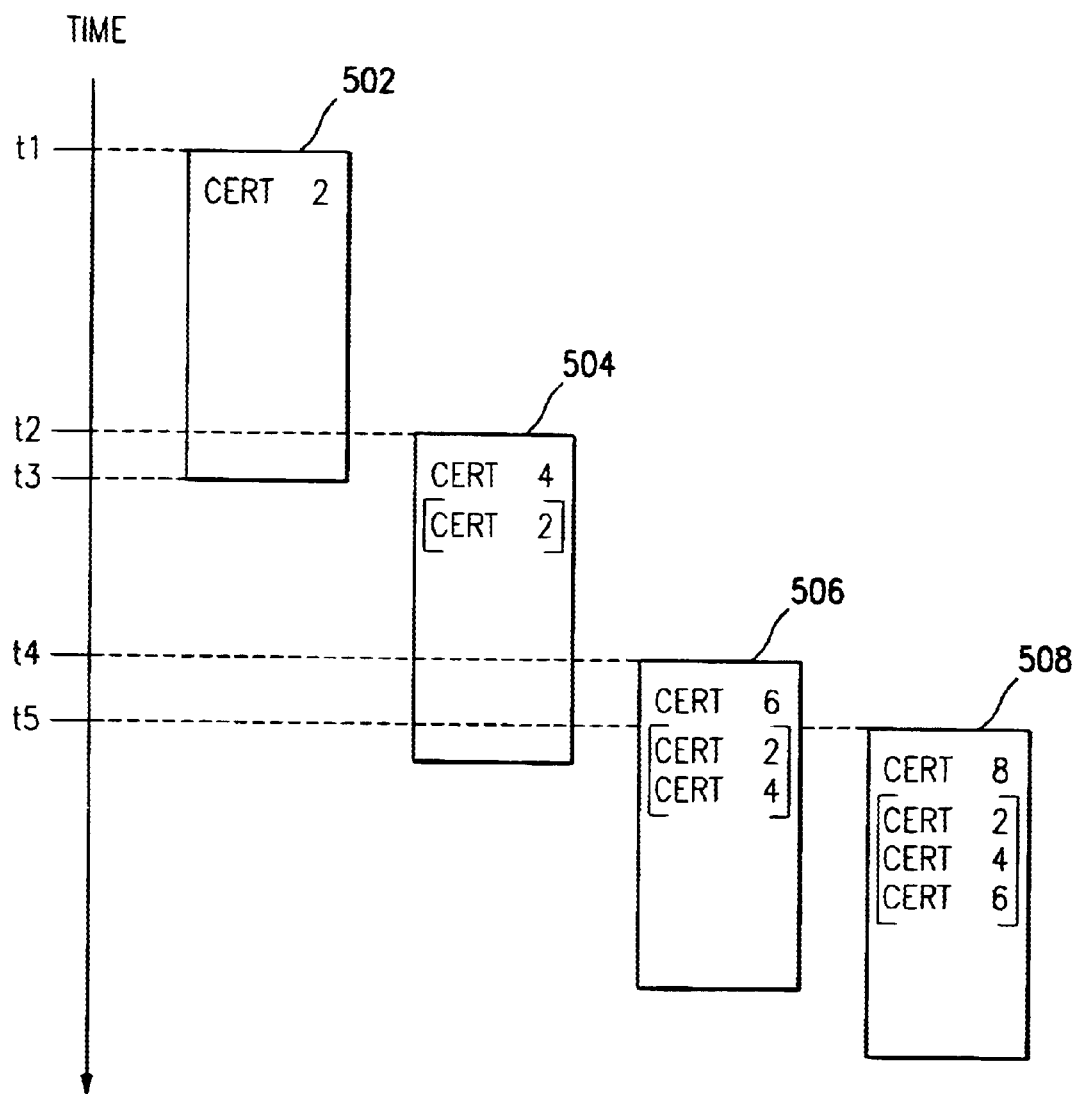
FIG. 5 is a timeline illustrating a series of digital certificates.

FIG. 5 is a timeline illustrating such a series of digital certificates 200. The bars 502, 504, 506, and 508 represent the periods of validity of digital certificates (not shown), which will be referred to as digital certificates 2, 4, 6, and 8, respectively, as indicated by "cert2", "cert4", "cert6", and "cert8". Assume that all four digital certificates meet the matching criteria of step 402. Digital certificate 2 becomes valid at time t1 and expires at time t3. At time t2, shortly before digital certificate 2 expires, subscriber 102 requests a new digital certificate and issuer 104 issues digital certificate 4. Since digital certificate 2 and digital certificate 4 have matching subscribers, the serial number of digital certificate 2 is included in digital certificate 4's serial number history extension, as indicated by "[cert 2]". Digital certificate 4 expires at time t6. At time t4, shortly before digital certificate 4 expires, subscriber 102 requests another new digital certificate and issuer 104 issues digital certificate 6. Digital certificate 6's serial number history extension would include the serial numbers of both digital certificates 2 and 4 even if issuer 4 knew about only digital certificate 4, because digital certificate 2 was included in digital certificate 4's serial number history extension. Note that digital certificate 6's serial number history extension includes digital certificate 2's serial number, even though digital certificates 2 and 6 do not overlap in time. At time t5, subscriber 102 compromises his private key. Accordingly, subscriber 102 requests a replacement, which is digital certificate 8. Digital certificate 8's serial number history extension includes the serial numbers of digital certificates 2, 4, and 6.

In an alternate approach, each of the serial number history extensions may only reference a single digital certificate. For example, the serial number history extensions of digital certificates 4, 6, and 8 may include only the serial number of digital certificate 2 since it was the first digital certificate issued to subscriber 102. Alternately, in the preferred variation of method 400 described above, each digital certificate may reference only the digital certificate which it replaces. Then, the serial number history extension of digital certificate 4 would include only the serial number of digital certificate 2; the extension of digital certificate 6 would include only the serial number of digital certificate 4; and the extension of digital certificate 8 would include only the serial number of digital certificate 6.

The methods illustrated in FIGS. 4 and 5 are exemplary only. Other embodiments will be apparent. For example, in step 402, digital certificates 200 may be identified on bases other than those described. For example, digital certificates 200 may be identified on the basis of any of the data about subscribers contained in the digital certificates 200 being the same. This data includes items such as name, address, or distinguished name. It may also include items such as credit card number, social security number, or driver's license, which may be contained in the digital certificate extensions 212. Alternately, digital certificates 200 may be identified by matching subscribers on bases external to the digital certificates 200. For example, in highly secure systems, subscribers may be required to show physical proof of identity before issuer 104 issues a new or replacement digital certificate 200. In this case, the relevant digital certificates 200 for the serial number history extension 216 may be identified on the basis of the physical proof. As another alternative, the serial numbers 202 for digital certificates 200 which have the same subscriber 102 may be included in the serial number history extension 216.

As further examples, in step 404, the information written is not limited to serial numbers 202. The information could be other types of identifiers. For example, the subscriber's distinguished name 206 could be included. This may only partially identify the digital certificates 200, since it is possible for many digital certificates 200 to have the same subscriber's distinguished name 206. However, if the subscriber's distinguished name 206 were coupled with the period of validity 208 of the digital certificate 200, including any revocations, this might be sufficient to uniquely identify each digital certificate 200. The issuer's distinguished name 204 might also be included, in order to differentiate digital certificates 200 with the same serial number 202 but different issuers 104. As a final example, one-way hashes or other processed versions of information, such as a one-way hash of the entire digital certificate 200, may also be included.

Figure 6:
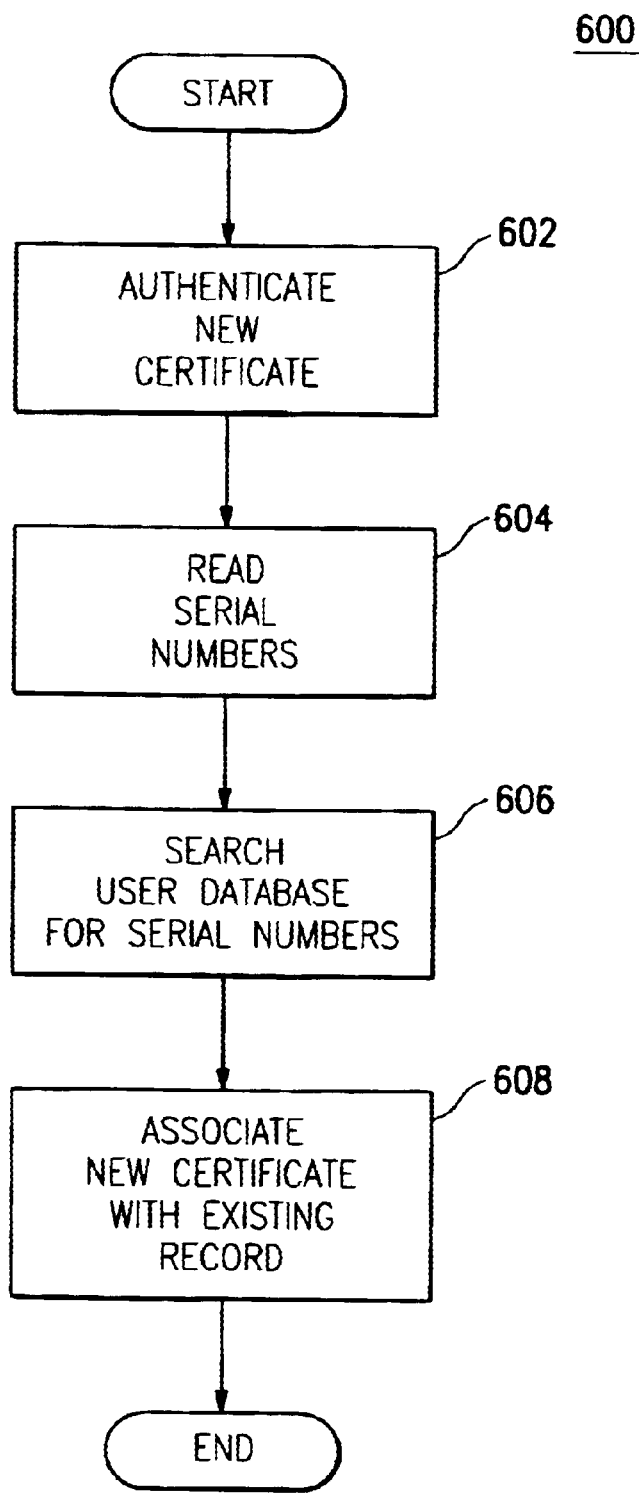
FIG. 6 is a flow diagram illustrating a method 600 for utilizing a digital certificate 200 with the user database of FIG. 3.

FIG. 6 is a flow diagram illustrating a method 600 for utilizing a digital certificate 200 with the user database of FIG. 3. This method illustrates how the problem discussed in conjunction with FIG. 3 may be addressed using the serial number history extension 216. To reiterate, the problem was that when subscriber 102 received a new digital certificate 200, user 108 would not be able to easily determine that record 310 is to be associated with subscriber 102 because record 310 was tied to the old digital certificate's serial number 202 and had no connection to the new digital certificate 200.

Now, however, user 108 will be able to associate the new digital certificate 200 with record 310 by using the serial number history extension 216 of the new digital certificate 200. User 108 authenticates 602 the new digital certificate 200 by verifying that the contents of the new digital certificate 200 have not been tampered with and by traversing the digital certificate's chain to an issuer which user 108 trusts. User 108 reads 604 the serial numbers in the serial number history extension 216 of the new digital certificate 200. These are serial numbers of other digital certificates which have subscribers which match the subscriber 102 of the new digital certificate 200. User 108 searches 606 the user database 130 for serial numbers 304 which match any of the serial numbers in the serial number history extension 216. If user 130 finds a matching serial number, user 130 knows that the subscriber 102 of the new digital 200 is likely to be the same as the subscriber of the found digital certificate.

Accordingly, user 108 associates 608 the new digital certificate 200 with record 310. In other words, the status of the found digital certificate, which in this case is serving as an index to record 310, is conferred on the new certificate 200.

Figure 7:
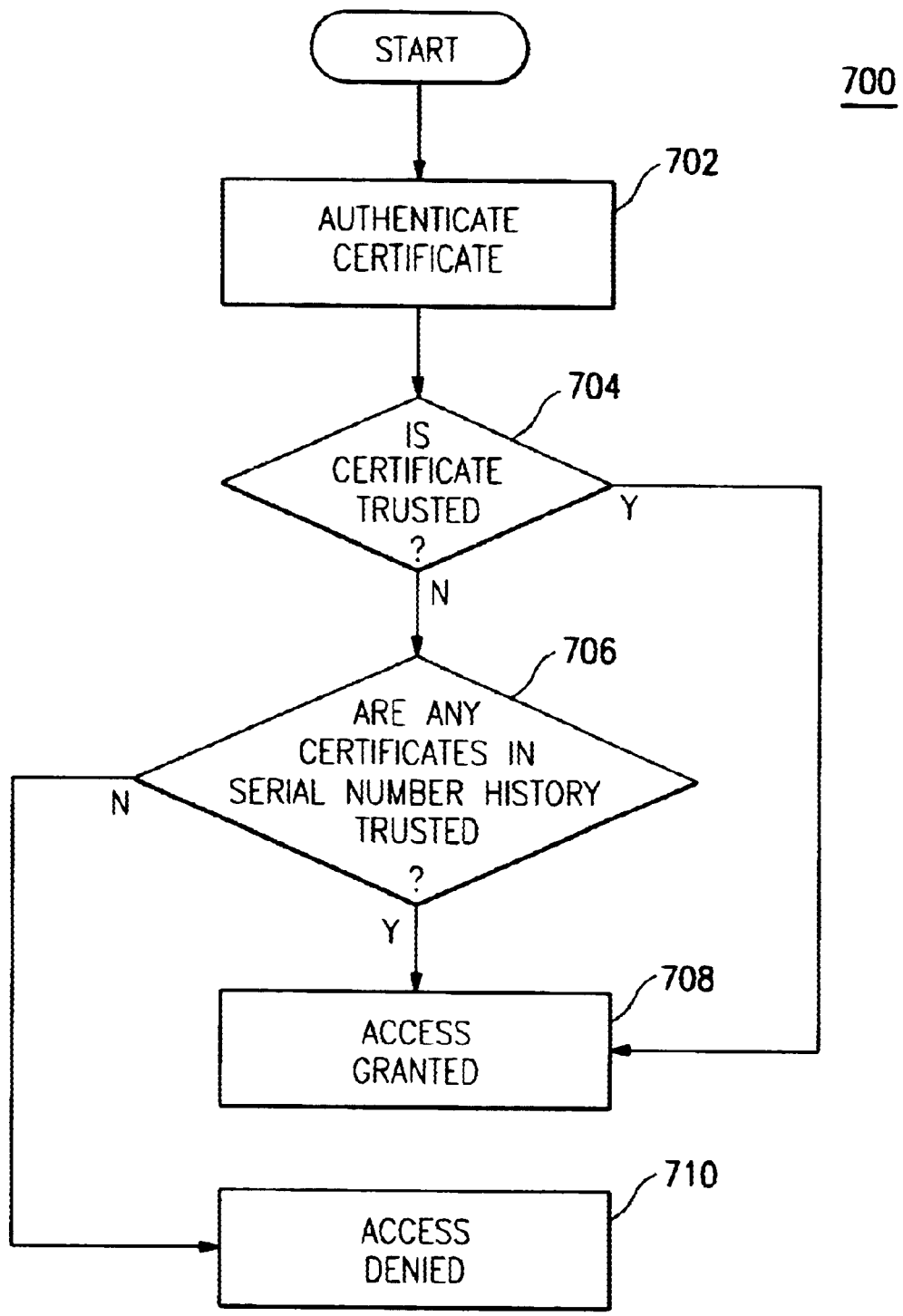
FIG. 7 is a flow diagram illustrating another method 700 for utilizing a digital certificate 200 in accordance with the user database of FIG. 3.

FIG. 7 is a flow diagram illustrating another method 700 for utilizing a digital certificate 200 with the user database of FIG. 3. This method will be explained using the stock-trading example described above, in which digital certificates are used to control access to a trading account or other resources. When a subscriber 102 wishes to access his account, user 108 authenticates 702 the subscriber 102's digital certificate. User 108 then determines whether the digital certificate 200 is a trusted digital certificate by comparing the digital certificate's serial number 202 against those 304 in the user database 130. The serial numbers 304 in database 130 have been previously processed and determined to be trustworthy by user 108. Hence, if there is an exact match in the serial numbers, user 108 grants 708 access to subscriber 102's account. If there is not an exact match, then user 108 determines 706 whether any of the serial numbers in the serial number history extension 216 are trusted by comparing these serial numbers to those in database 130. Again, if there is an exact match, then user 108 grants 708 access to subscriber 102's account. Otherwise, access is denied 710. In this case, the new digital certificate 200 is processed as if it had the same or a similar degree of trustworthiness as the previously processed digital certificates referred to in its serial number history extension 216. As discussed previously, depending on the degree of security required, items besides just the serial number 202 may be used. For example, the serial number 202 and issuer 104 may be included as part of the serial number history extension 216, or a one-way hash of the entire digital certificate may also be included.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for creating a first digital certificate for a first subscriber, wherein the first digital certificate binds the first subscriber to a first public key corresponding to a first private key held by the first subscriber, and the first public key and the first private key form a key pair for use in public-key cryptography, the method comprising:

determining, based on a predefined criteria, that the first subscriber is the same as a second subscriber of a second digital certificate, wherein the second digital certificate binds the second subscriber to a second public key corresponding to a second private key held by the second subscriber, and the second public key and the second private key form a key pair for use in public-key cryptography;

including in the first digital certificate related certificate information at least partially identifying the second digital certificate, wherein inclusion of the related certificate information in the first digital certificate indicates that it has been determined that the first subscriber is the same as the second subscriber according to the predefined criteria; and digitally signing the first digital certificate.

2. The method of claim 1 wherein the related certificate information uniquely identifies the second digital certificate.

3. The method of claim 1 wherein the related certificate information includes a serial number of the second digital certificate.

4. The method of claim 1 wherein the step of determining, based on a predefined criteria, that the first subscriber is the same as the second subscriber comprises:

determining, based on the predefined criteria, that the first subscriber is the same as a third subscriber of a third digital certificate, wherein the third digital certificate binds the third subscriber to a third public key corresponding to a third private key held by the third subscriber, the third public key and the third private key form a key pair for use in public-key cryptography, the third certificate includes related certificate information at least partially identifying the second digital certificate, and inclusion of the related certificate information in the third digital certificate indicates that it has been determined that the third subscriber is the same as the second subscriber according to the predefined criteria; and identifying the second digital certificate based on the related certificate information in the third digital certificate.

5. The method of claim 1 wherein the related certificate information pertains to the second subscriber.

6. The method of claim 1 wherein the related certificate information pertains to a period of validity of the second digital certificate.

7. The method of claim 6 wherein the related certificate information includes a date selected from the group of dates comprising:

an effective date for the second digital certificate, an expiration date for the second digital certificate, and a revocation date for the second digital certificate.

8. The method of claim 1 wherein the related certificate information includes data which has been one-way hashed.

9. The method of claim 1 wherein:

the first digital certificate includes a distinguished name of the first subscriber;

the second digital certificate includes a distinguished name of the second subscriber; and the step of determining that the first subscriber is the same as the second subscriber comprises determining that a predefined portion of the distinguished name on the first digital certificate is the same as a corresponding portion of the distinguished name on the second digital certificate.

10. The method of claim 1 wherein:

the first digital certificate includes data pertaining to the first subscriber;

the second digital certificate includes data pertaining to the second subscriber; and the step of determining that the first subscriber is the same as the second subscriber comprises determining that the data pertaining to the first subscriber on the first digital certificate is the same as the data pertaining to the second subscriber on the second digital certificate.

11. The method of claim 1 wherein the step of determining that the first subscriber is the same as the second subscriber comprises:

determining that data pertaining to the first subscriber not contained on the first digital certificate is the same as corresponding data pertaining to the second subscriber not contained on the second digital certificate.

12. The method of claim 1 wherein the step of determining that the first subscriber is the same as the second subscriber comprises:

determining that the first digital certificate is a replacement of the second digital certificate.

13. The method of claim 1, wherein the step of determining that the first subscriber is the same as the second subscriber comprises:

determining that the first digital certificate is a renewal of the second digital certificate.

14. The method of claim 1 wherein:

the first and second digital certificates comply with the X.509 format; and the related certificate information is stored as an X.509 extension.

15. The method of claim 14 wherein:

the related certificate information includes an X.509 extension including a serial number of the second digital certificate;

the first and second digital certificates each include a subscriber distinguished name of their respective subscribers; and the step of determining that the first subscriber is the same as the second subscriber comprises determining that the distinguished name on the first digital certificate is the same as the distinguished name on the second digital certificate.

16. The method of claim 1 wherein the step of determining that the first subscriber is the same as the second subscriber comprises:

determining that the first subscriber is trusted to a same degree as the second subscriber.

17. The method of claim 1 wherein the step of determining that the first subscriber is the same as the second subscriber comprises:

determining that the first subscriber is entitled to a similar degree of access to resources as the second subscriber.

18. A computer readable medium storing instructions for controlling a processor to execute one of the methods of claims 1–4, 8–13, 16 or 17.

19. A method for processing a first digital certificate including related certificate information, wherein the first digital certificate binds a first subscriber to a first public key corresponding to a first private key held by the first subscriber, and the first public key and the first private key form a key pair for use in public-key cryptography, the method comprising:

authenticating the first digital certificate;

reading the related certificate information from the first digital certificate, wherein the related certificate information at least partially identifies a second digital certificate the second digital certificate binds a second subscriber to a second public key corresponding to a second private key held by the second subscriber, the second public key and the second private key form a key pair for use in public-key cryptography, and inclusion of the related certificate information in the first digital certificate indicates that it has been determined that the first subscriber is the same as the second subscriber according to a predefined criteria;

identifying the second digital certificate based on the related certificate information;

determining a status of the second digital certificate; and responsive to the status of the second digital certificate, processing the first digital certificate.

20. The method of claim 19 wherein:

the step of determining the status of the second digital certificate comprises determining a degree to which the second digital certificate is trusted; and the step of processing the first digital certificate comprises processing the first digital certificate with a similar degree of trust as the second digital certificate.

21. The method of claim 20 wherein the step of processing the first digital certificate further comprises granting access to resources based on a similar degree of trust as the second digital certificate.

22. The method of claim 19 wherein:

the step of determining the status of the second digital certificate comprises determining data to which the second digital certificate is used as an index; and the step of processing the first digital certificate comprises using the first digital certificate as an index to the data.

23. The method of claim 19 wherein the step of processing the first digital certificate comprises conferring the status of the second digital certificate onto the first digital certificate.

24. The method of claim 19 wherein the first digital certificate is a replacement of the second digital certificate.

25. The method of claim 19 wherein the first digital certificate is a renewal of the second digital certificate.

26. The method of claim 19 wherein:

the first and second digital certificates comply with the X.509 format; and the related certificate information is stored as an X.509 extension.

27. A computer readable medium storing instructions for controlling a processor to execute one of the methods of claims 19–23 or 24–26.

* * * * *

UNITED STATES PATENT AND TRADEMARK OFFICE
CERTIFICATE OF CORRECTION

PATENT NO. : 6,615,347 B1
DATED : September 2, 2003
INVENTOR(S) : Mahinda K. deSilva and Ram A. Moskovitz It is certified that error appears in the above-identified patent and that said Letters Patent is hereby corrected as shown below:

<u>Column 11,</u>
Line 37, please replace "8-13" with -- 9-13 --.

<u>Column 12,</u>
Line 1, please replace "certificate the" with -- certificate, the --.

Signed and Sealed this

Twentieth Day of January, 2004

JON W. DUDAS
*Acting Director of the United States Patent and Trademark Office*